US012128462B1

(12) United States Patent
Lucas et al.

(10) Patent No.: US 12,128,462 B1
(45) Date of Patent: Oct. 29, 2024

(54) METHOD OF CLEANING AN ORGANICS STREAM DURING RECYCLING

(71) Applicants: Rich Lucas, Jordan, MN (US); Glen Jeurissen, Belle Plaine, MN (US); Kevin Pedretti, Prior Lake, MN (US)

(72) Inventors: Rich Lucas, Jordan, MN (US); Glen Jeurissen, Belle Plaine, MN (US); Kevin Pedretti, Prior Lake, MN (US)

(73) Assignee: Scott Equipment Company, New Prague, MN (US)

( * ) Notice: Subject to any disclaimer, the term of this patent is extended or adjusted under 35 U.S.C. 154(b) by 251 days.

(21) Appl. No.: 17/971,213

(22) Filed: Oct. 21, 2022

Related U.S. Application Data

(60) Provisional application No. 63/270,790, filed on Oct. 22, 2021.

(51) Int. Cl.
  *B09B 3/35* (2022.01)
  *B03B 9/06* (2006.01)
  *B09B 101/70* (2022.01)
  *C05F 9/04* (2006.01)

(52) U.S. Cl.
  CPC .................. *B09B 3/35* (2022.01); *B03B 9/06* (2013.01); *B09B 2101/70* (2022.01); *C05F 9/04* (2013.01)

(58) Field of Classification Search
  CPC .......... B09B 3/35; B09B 2101/70; B03B 9/06
  USPC ...................................................... 209/12.1
  See application file for complete search history.

(56) References Cited

U.S. PATENT DOCUMENTS

| | | | |
|---|---|---|---|
| 5,887,808 A * | 3/1999 | Lucas | B02C 13/2804 |
| | | | 241/82 |
| 6,248,156 B1 | 6/2001 | Lucas | |
| 6,713,112 B1 * | 3/2004 | Lucas | B01D 50/40 |
| | | | 55/423 |
| 9,174,219 B2 * | 11/2015 | Lucas | B02C 13/28 |
| 9,174,220 B2 | 11/2015 | Lucas et al. | |
| 11,065,624 B2 * | 7/2021 | Lucas | B02C 18/142 |
| 2022/0048036 A1 | 2/2022 | Pedretti et al. | |

FOREIGN PATENT DOCUMENTS

DE  4019407 A  * 12/1991  ......... B02C 18/0076

* cited by examiner

*Primary Examiner* — Terrell H Matthews
(74) *Attorney, Agent, or Firm* — Edwin E. Voigt, II

(57) ABSTRACT

A method for processing organics includes the introduction of mixed organic and inorganic material into a separator and reducing the material into large and small fragments of inorganic material and a recovered organic stream. Removing a portion of the large fragments of inorganic material from the separator. Transporting the recovered organic stream to a de-pulping machine and processing the recovered organic stream in the de-pulping machine. Removing at least a portion of the small fragments of inorganic material providing a de-pulped organic stream. Depositing the de-pulped organic stream into a de-pulped organics container where the de-pulped organic stream may be post processed into recycled material.

20 Claims, 1 Drawing Sheet

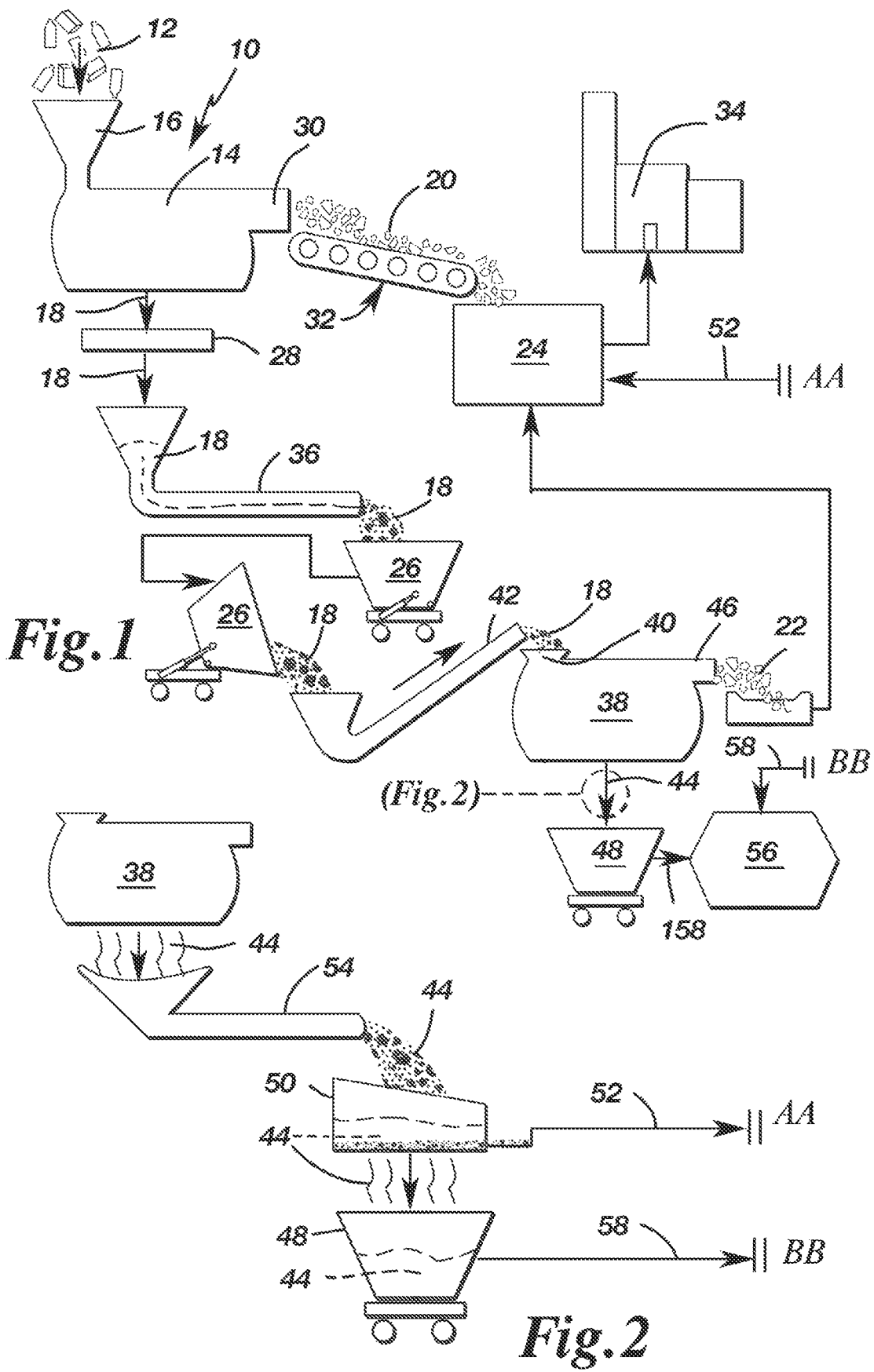

METHOD OF CLEANING AN ORGANICS STREAM DURING RECYCLING

CROSS-REFERENCE TO RELATED APPLICATIONS

This application claims the benefit of U.S. Provisional Patent Application Ser. No. 63/270,790 filed Oct. 22, 2021 the entire contents of which being incorporated by reference herein in its entirety.

FIELD OF THE INVENTION

This invention relates to the removal of inorganic container or packaging material from organic material in an initial and secondary process, reducing the amount of contaminants remaining in the processed organic material, thereby improving the quality of the recycled processed organic material for configuration into a reusable form.

BACKGROUND

Recycling inorganic material in the form of waste packaging or containers is critical to the environment. Recycling of organic material located within the waste inorganic material is also an environmentally and economically sound practice.

In the past numerous obstacles existed for extraction of organic materials as included within waste inorganic material.

In the past the removal of the organic material from the inorganic material occurred through the use of a turbo separator or other organics preprocessing equipment. Processing through the use of conventional equipment/devices causes the fracture and/or shattering of the inorganic materials while located in the separator. The turbo separator or other organics preprocessing equipment retrieves and isolates the larger sized inorganic materials for recycling. However, an unsatisfactory volume of small sized inorganic material frequently remains in the processed organic material as a result of the fracture and/or shattering of the inorganic material as processed by the turbo separator or other organics preprocessing equipment.

The inclusion of small sized inorganic material, as mixed within the processed organic material, frequently rendered the processed organic material unsuitable for an intended purpose.

The remaining reduced and relatively small sized inorganic materials contaminate the recovered organic stream, and enter into post processing, examples of which include but are not limited to composting, anaerobic digestion, or repurposed animal nutrition, as contamination and/or "pollution".

The inorganic materials are typically packaging materials used for the storage or transport of consumable food related goods, from small single use packets to large pails or sacks of accumulated organics.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56 (a) exists.

All U.S. patents and applications and all other published documents mentioned anywhere in this application are incorporated herein by reference in their entirety.

Without limiting the scope of the invention, a brief description of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

General Description of the Invention

The inventive process relates to the removal of large and small sized fragments of inorganic materials 20, 22, such as wood, paper, glass, film plastic or rigid plastic from recovered mixed organic and inorganic material 12. Processing provides a recovered organic stream 18 exiting a turbo separator or other organics preprocessing equipment 14. Processing may also yield organic slurries generated from source separated organics from a mixed inorganic and organic materials source 12.

In at least one embodiment the inventive process includes the introduction of unusable or waste food or other mixed organic and inorganic material 12 as included within inorganic packaging or containers, into an inlet hopper 16 of a turbo separator or other organics preprocessing equipment 14. The turbo separator or other organics preprocessing equipment 14 reduces and separates large sized fragments of inorganic material 20 from the reduced organic material within the processing chamber. The reduced organic material frequently exits the processing chamber in the form of a slurry or as a recovered organic stream 18 proximate to the bottom of the turbo separator or other organics preprocessing equipment 14.

The large sized fragments of inorganic material 20 exit the processing chamber at an outlet 30 which is frequently located on an upper portion of the processing chamber distally removed relative to the inlet hopper 16 and inlet. Processing frequently occurs through the use of a longitudinally extending shaft having outwardly extending paddles rotating at high speeds within the processing chamber of the turbo separator or other organics preprocessing equipment 14.

The large sized fragments of inorganic material 20 may be transported from the outlet 30 through the use of a inorganic transport mechanism 32 which may be gravity, a rotating auger or through the use of a conveyor to an inorganic collection container 24. Alternatively, the inorganic transport mechanism 32 may be formed of screw conveyors, belt conveyors, pneumatic conveying, or another type of conveying method at the discretion of an individual.

The inorganic collection container 24 including the large sized fragments of inorganic material 20 may be transported to a suitable recycling facility 34.

The reduced and recovered organic stream 18 typically drops/falls from the bottom of the processing chamber through a grate and/or screen having relatively large openings. The recovered organic stream 18 may be transported to an organics tote/container 26 through the use of a organics transport mechanism 36 which may be a rotating auger, a conveyor, a chute or a tube, or any other type of fluid transfer mechanism including the use of pumps and hoses or pipes. Alternatively, the organics transport mechanism 36 may be formed of screw conveyors, belt conveyors, pneumatic conveying, or another type of conveying method at the discretion of an individual. In another alternative embodiment the organics tote/container 26 may be located directly below the turbo separator or other organics preprocessing equipment 14.

In at least one alternative embodiment, the recovered organic stream 18, immediately upon exit from the processing chamber, passes through an initial screen 28 having any desired size of openings which are used to obstruct passage, and to capture inorganic material which has not exited the processing chamber through the outlet 30. The inorganic material captured by the initial screen 28 may be removed from the initial screen 28 and placed within the inorganic collection container 24 for transportation to a recycling facility 34.

An organics tote/container 26 containing the recovered organic stream 18 may be moved from the area proximate to the turbo separator or other organics preprocessing equipment 14 to a de-pulping machine 38. The organics tote/container 26 may then be lifted for transfer of the recovered organic stream 18 into the de-pulping inlet 40. Alternatively a de-pulp inlet transport mechanism 42 may move the recovered organic stream 18 from the organics tote/container 26 to the de-pulping inlet 40. The de-pulp inlet transport mechanism 42 may be a rotating auger, a conveyor, a chute, or a tube or any other type of fluid transfer mechanism including the use of pumps and hoses or pipes. Alternatively, the de-pulp inlet transport mechanism 42 may be formed of screw conveyors, belt conveyors, pneumatic conveying, or another type of conveying method at the discretion of an individual.

The recovered organic stream 18 as introduced into the de-pulping machine 38 is then processed to remove the small sized fragments of inorganic material 22, to provide a de-pulped organic stream 44. The captured small sized fragments of inorganic material 22 will be collected at the material capture outlet 46 and then transferred to, and deposited within, the inorganic collection container 24 for recycling as earlier described. The de-pulped organic stream 44 will be collected in de-pulped organics tote/containers 48. The de-pulped organic stream 44 may then be transported for post processing 56 into composting, anaerobic digestion material, or repurposed animal nutrition material to name of few of the many types of products uses for recovered and recycled organic material.

In at least one alternative embodiment, prior to post processing, the de-pulped organic stream 44 may be passed through a first sieve 50 to separate and to remove miniature sized fragments of inorganic material 52. The miniature sized fragments of inorganic material 52 captured at the first sieve 50 may be transferred to the inorganic collection container 24 for recycling as earlier described.

The de-pulped organic stream 44 may be transferred to the first sieve 50 through the use of the de-pulped organics tote/containers 48 or through the use of a sieve transport mechanism 54, which may be a rotating auger, a conveyor, a chute, or a tube or any other type of fluid transfer mechanism including the use of pumps and hoses or pipes to name a few, as earlier described. Alternatively, the sieve transport mechanism 54 may be formed of screw conveyors, belt conveyors, pneumatic conveying, or another type of conveying method at the discretion of an individual.

It should be noted that the de-pulped organic stream 44 may be consecutively passed through any number of first, second, third, or fourth or more sieves as desired. Each of the consecutive processing sieves having incrementally smaller openings to capture incrementally smaller fragments of inorganic material for filtering/refinement of the de-pulped organic stream 44 prior to post processing.

The inorganic material captured by the desired number of sieves being removed and incorporated into the inorganic collection container 24 for recycling as earlier described.

While the foregoing is a description of some of the embodiments for carrying out the invention for the purposes of complying with 37 C.F.R. 1.72, it is also intended in an illustrative rather than a restrictive sense. Variations to the exact embodiment described may be apparent to those skilled in such equipment without departing from the spirit and scope of the invention as defined by the claims set out below.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE DRAWINGS

FIG. 1 is a block diagram of one alternative embodiment of the method of cleaning an organics stream during recycling; and FIG. 2 is a detail block diagram of one alternative embodiment of the method of cleaning an organics stream during recycling which occurs after the de-pulping step.

DETAILED DESCRIPTION OF THE PREFERRED EMBODIMENTS

In at least one embodiment, as depicted in FIG. 1 and FIG. 2, the method of cleaning an organics stream during recycling in represented generally by reference numeral 10. The method of cleaning an organics stream during recycling 10 involves the removal of large and small sized fragments of inorganic materials 20, 22, such as wood, paper, glass, film plastic or rigid plastic from recovered mixed organic and inorganic material 12. Processing provides a recovered organic stream 18 exiting a turbo separator or other organics preprocessing equipment 14. Processing may also yield organic slurries generated from source separated organics from a mixed inorganic and organic materials source 12.

In at least one embodiment the inventive process includes the introduction of unusable or waste food or other mixed organic and inorganic material 12 as included within inorganic packaging or containers, into an inlet hopper 16 of a turbo separator or other organics preprocessing equipment 14. The turbo separator or other organics preprocessing equipment 14 reduces and separates large sized fragments of inorganic material 20 from the reduced organic material within the processing chamber. The reduced organic material frequently exits the processing chamber in the form of a slurry or as a recovered organic stream 18 proximate to the bottom of the turbo separator or other organics preprocessing equipment 14.

The large sized fragments of inorganic material 20 exit the processing chamber at an outlet 30 which is frequently located on an upper portion of the processing chamber distally removed relative to the inlet hopper 16 and inlet. Processing frequently occurs through the use of a longitudinally extending shaft having outwardly extending paddles rotating at high speeds within the processing chamber of the turbo separator or other organics preprocessing equipment 14.

The large sized fragments of inorganic material 20 may be transported from the outlet 30 through the use of a inorganic transport mechanism 32 which may be gravity, a rotating auger or through the use of a conveyor to an inorganic collection container 24. Alternatively, the inorganic transport mechanism 32 may be formed of screw conveyors, belt conveyors, pneumatic conveying, or another type of conveying method at the discretion of an individual. The inorganic collection container 24 including the large sized fragments of inorganic material 20 may be transported to a suitable recycling facility 34.

The reduced and recovered organic stream 18 typically drops/falls from the bottom of the processing chamber through a grate and/or screen having relatively large openings. The recovered organic stream 18 may be transported to and deposited within an organics tote/container 26 through the use of a organics transport mechanism 36 which may be a rotating auger, a conveyor, a chute or a tube, or any other type of fluid transfer mechanism including the use of pumps and hoses or pipes. Alternatively, the organics transport mechanism 36 may be formed of screw conveyors, belt conveyors, pneumatic conveying, or another type of conveying method at the discretion of an individual. In another alternative embodiment, the organics tote/container 26 may be located directly below the turbo separator or other organics preprocessing equipment 14 to receive the recovered organic stream 18.

Alternatively, an organics tote/container 26 may be omitted and the reduced and recovered organic stream 18 may be moved directly to a de-pulping machine 38 and de-pulping inlet 40, through the use of the organics transport mechanism 36, which may be a rotating auger, a conveyor, a chute or a tube, or any other type of fluid transfer mechanism including the use of pumps and hoses or pipes. Alternatively, the organics transport mechanism 36 may be formed of screw conveyors, belt conveyors, pneumatic conveying, or another type of conveying method at the discretion of an individual.

In at least one alternative embodiment, the recovered organic stream 18, exiting the processing chamber, passes through an initial screen 28 having any desired size of openings which are used to obstruct passage, and to capture inorganic material which has not exited the processing chamber through the outlet 30. The inorganic material captured by the initial screen 28, may be removed from the initial screen 28 and placed within the inorganic collection container 24 for transportation to a recycling facility 34. The removal of large, medium or small sized fragments of inorganic material 22 from the initial screen 28 may occur manually through the use of a rake or squeegee.

An organics tote/container 26 containing the recovered organic stream 18 may be moved from the area proximate to the turbo separator or other organics preprocessing equipment 14 to the de-pulping machine 38. The organics tote/container 26 may then be lifted for transfer of the recovered organic stream 18 into the de-pulping inlet 40.

Alternatively a de-pulp inlet transport mechanism 42 may move the recovered organic stream 18 from the organics tote/container 26 to the de-pulping inlet 40. The de-pulp inlet transport mechanism 42 may be a be a rotating auger, a conveyor, a chute, or a tube or any other type of fluid transfer mechanism including the use of pumps and hoses or pipes. Alternatively, the de-pulp inlet transport mechanism 42 may be formed of screw conveyors, belt conveyors, pneumatic conveying, or another type of conveying method at the discretion of an individual.

The de-pulping machine 38 may be, or may be similar to, the types of de-pulping machines used in other industries such as the orange juice industry. The existence of small sized fragments of inorganic material 22 such as wood, paper, glass, film plastic or rigid plastic within the recovered organic stream 18 may be present during processing, recovery and recycling of food waste, regardless as to the type of de-packaging and/or turbo separator or other organics preprocessing equipment 14 utilized.

The recovered organic stream 18 as introduced into the de-pulping machine 38 is then processed to remove the small sized fragments of inorganic material 22, to provide a de-pulped organic stream 44. The captured small sized fragments of inorganic material 22 will be collected at the material capture outlet 46 and then transferred to, and deposited within, the inorganic collection container 24 for recycling as earlier described.

In one example the de-pulping machine 38 was operated at a processing rate of 10.5 tons per hour. The duration of the processing of the recovered organic stream 18 in the de-pulping machine 38 was approximately 7.5 minutes.

In another example the de-pulping machine 38 was operated to process 2,781 pounds of recovered organic stream 18 for a duration of time of approximately 7.5 minutes. In this example at the conclusion of the de-pulping process, a net weight of 2,634 pounds of de-pulped organic stream 44 was obtained. The de-pulping process of the recovered organic stream 18 removed 147 pounds of small sized fragments of inorganic material 22 in order to provide the de-pulped organic stream 44.

In one example, the average size of inorganic material remaining in the de-pulped organic stream 44 at the conclusion of the de-pulping process is approximately 1.2 millimeters.

In another example, the de-pulping machine 38 was operated to process 35,460 pounds of recovered organic stream 18 per hour. In this example at the conclusion of the de-pulping process, a net weight of 2,955 pounds of de-pulped organic stream 44 was obtained. The de-pulping process of the recovered organic stream 18 removed 138 pounds of small sized fragments of inorganic material 22 from the recovered organic stream 18.

In another example, the de-pulping machine 38 was operated to process 2,963 pounds of recovered organic stream 18 per hour. In this example at the conclusion of de-pulping, a net weight of 2,820 pounds of de-pulped organic stream 44 was obtained. The de-pulping process of the recovered organic stream 18 removed 143 pounds of small sized fragments of inorganic material 22 from the recovered organic stream 18 in order to provide the de-pulped organic stream 44.

The de-pulped organic stream 44 will be collected in de-pulped organics tote/containers 48. The de-pulped organics tote/containers 48 may then be transported for post processing into composting, anaerobic digestion material, or repurposed animal nutrition material to name of few of the many types of products uses for recovered and recycled organic material.

Alternatively, the de-pulped organic stream 44 may be deposited within a tank, tanker truck, or other collection device through the use of pumps, hoses and/or pipes with or without the use of the de-pulped organics tote/containers 48.

In at least one alternative embodiment, prior to post processing, the de-pulped organic stream 44 may be passed through a first sieve 50 to separate and to remove miniature sized fragments of inorganic material 52. The de-pulped organic stream 44 may be transferred to the first sieve 50 through the use of the de-pulped organics tote/containers 48 or through the use of a sieve transport mechanism 54, which may be a rotating auger, a conveyor, a chute, or a tube or any other type of fluid transfer mechanism including the use of pumps and hoses or pipes to name a few, as earlier described. Alternatively, the sieve transport mechanism 54 may be formed of screw conveyors, belt conveyors, pneumatic conveying, or another type of conveying method at the discretion of an individual.

The miniature sized fragments of inorganic material 52 captured at the first sieve 50 may be transferred to the inorganic collection container 24 for recycling as earlier described. The transfer of the miniature sized fragments of inorganic material 52 to the inorganic collection container 24 is shown through pathway AA.

It should be noted that the de-pulped organic stream 44 may be consecutively passed through any number of first, second, third, or fourth or more sieves as desired. Each of the consecutive processing sieves having incrementally smaller openings to capture incrementally smaller fragments of inorganic material for refinement of the de-pulped organic stream 44 prior to post processing.

The inorganic material captured by the desired number of sieves being removed and incorporated into the inorganic collection container 24 for recycling as earlier described.

The de-pulped organic stream 44 following exit from the de-pulping machine 38 or any sieve, may be placed into a de-pulped organics tote/containers 48 which may be a tank or any other type of container appropriate for transportation of material being liquid, at least partially liquid, or having a high moisture content. The storage container or tank of de-pulped organic stream 44 is then transported as identified by reference numeral 58 to post processing 56 as identified herein. The transfer of the de-pulped organic stream 44 from the first sieve 50 to the de-pulped organics tote/containers 48 and then to post processing 56 is shown by reference numeral 58 and pathway BB.

In a first embodiment, a method for processing organics includes the step of introducing mixed organic material and inorganic material into an inlet hopper of a separator; the step of processing the mixed organic material and inorganic material in the separator reducing the mixed organic material and inorganic material into large fragments of inorganic material, small fragments of inorganic material, and a recovered organic stream; the step of removing at least a portion of the large fragments of inorganic material through a separator outlet; the step of transporting the recovered organic stream to a de-pulping inlet of a de-pulping machine and introducing the recovered organic stream into the de-pulping machine; the step of processing the recovered organic stream in the de-pulping machine and removing at least a portion of the small fragments of inorganic material from the recovered organic stream to provide a de-pulped organic stream; and the step of depositing the de-pulped organic stream into a de-pulped organics container.

In a second alternative embodiment according to the first embodiment, the method further includes the step of moving at least a portion of the large fragments of inorganic material from the separator outlet to an inorganic collection container.

In a third alternative embodiment according to the first embodiment, the organic material includes expired food or waste food and the inorganic material includes packaging or waste receptacles.

In a fourth alternative embodiment according to the first embodiment, the method includes the step of transferring the de-pulped organics container or the de-pulped organic stream within the de-pulped organics container to a post processing operation, the post processing operation transforming the de-pulped organic stream into organic recycled material.

In a fifth alternative embodiment according to the first embodiment, the method includes the step of transporting the recovered organic stream to the de-pulping inlet by engaging a organics transport mechanism placing the recovered organic stream into an organics container.

In a sixth alternative embodiment according to the first embodiment, the method includes the step of transporting the recovered organic stream by placing the recovered organic stream into an organics container and further comprising engaging a de-pulp inlet transport mechanism transferring the organics container to the de-pulping inlet.

In a seventh alternative embodiment according to the first embodiment, the method includes the step of engaging an organics transport mechanism to move the recovered organic stream to the de-pulping inlet.

In an eighth alternative embodiment according to the first embodiment, the method includes the step of transferring the de-pulped organic stream to at least one sieve before the introducing of the de-pulped organic stream into the de-pulped organics container.

In a ninth alternative embodiment according to the first embodiment, the method includes the step of passing the recovered organic stream through an initial screen prior to the transporting of the recovered organic stream to the de-pulping inlet, the initial screen removing at least a remaining portion of the large fragments of inorganic material from the recovered organic stream.

In a tenth alternative embodiment according to the second embodiment, the method includes the step of engaging an inorganic transport mechanism and moving the at least a portion of the large fragments of inorganic material to the inorganic collection container.

In an eleventh alternative embodiment according to the second embodiment, the de-pulped organic stream comprises miniature fragments of inorganic material.

In a twelfth alternative embodiment according to the second embodiment, the method includes the step of moving the removed portion of small fragments of inorganic material from a material capture outlet to a de-pulp inorganic collection container.

In a thirteenth alternative embodiment according to the second embodiment, the method includes the step of transporting the inorganic collection container to an inorganic recycling facility.

In a fourteenth alternative embodiment according to the eighth embodiment, the method includes the step of transferring the de-pulped organic stream to the at least one sieve by the use of a sieve transport mechanism.

In a fifteenth alternative embodiment according to the eighth embodiment, the method includes the step of transferring the de-pulped organic stream to a first sieve, said de-pulped organic stream exiting the first sieve and entering a second sieve, and the de-pulped organic stream exiting the second sieve prior to deposit of the de-pulped organic stream into the de-pulped organics container.

In a sixteenth alternative embodiment according to the eighth embodiment, the method includes the step of transferring the de-pulped organics container or the de-pulped organic stream within the de-pulped organics container to a post processing operation, the post processing operation transforming the de-pulped organic stream into organic recycled material.

In a seventeenth alternative embodiment according to the ninth embodiment, the method includes the step of moving the remaining portion of the large fragments of inorganic material from the initial screen to the inorganic collection container.

In an eighteenth alternative embodiment according to the eleventh embodiment, the method includes the step of the at least one sieve removing at least a portion of the miniature fragments of inorganic material from the de-pulped organic stream.

In a nineteenth alternative embodiment according to the twelfth embodiment, the method includes the step of transferring the removed portion of small fragments of inorganic material from the de-pulp inorganic collection container to the inorganic collection container.

In a twentieth alternative embodiment according to the eighteenth embodiment, the method includes the step of transferring the removed portion of the miniature fragments of inorganic material to the inorganic collection container.

This disclosure also incorporates by reference herein U.S. patent application Ser. No. 17/210,077 as filed on Mar. 23, 2021; U.S. Pat. No. 11,065,624, as filed on Mar. 23, 2021, and as issued on Jul. 20, 2021; U.S. Pat. No. 9,174,220, as filed on Apr. 29, 2014, and as issued on Nov. 3, 2015; U.S. Pat. No. 9,174,219, as filed on May 1, 2014, and as issued on Nov. 3, 2015; U.S. Pat. No. 6,713,112, as filed on Mar. 12, 2001, and as issued on Mar. 30, 2004; U.S. Pat. No. 5,887,808, as filed on Jan. 6, 1998, and as issued on Mar. 30, 1999; and U.S. Pat. No. 6,248,156, as filed on May 3, 1999, and as issued on Jun. 19, 2001 in their entireties.

While the foregoing is a description of the preferred embodiments for carrying out the invention for the purposes of complying with 37 C.F.R. 1.72, it is also intended in an illustrative rather than a restrictive sense. Variations to the exact embodiment described may be apparent to those skilled in such equipment without departing from the spirit and scope of the invention as defined by the claims set out below.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

I claim:

1. A method for processing organics comprising:
   introducing mixed organic material and inorganic material into an inlet hopper of a separator;
   processing said mixed organic material and inorganic material in said separator reducing said mixed organic material and inorganic material into large fragments of inorganic material, small fragments of inorganic material, and a recovered organic stream;
   removing at least a portion of said large fragments of inorganic material through a separator outlet;
   transporting said recovered organic stream to a de-pulping inlet of a de-pulping machine and introducing said recovered organic stream into said de-pulping machine;
   processing said recovered organic stream in said de-pulping machine and removing at least a portion of said small fragments of inorganic material providing a de-pulped organic stream; and
   depositing said de-pulped organic stream into a de-pulped organics container.

2. The method according the claim 1, further comprising moving at least a portion of said large fragments of inorganic material from said separator outlet to an inorganic collection container.

3. The method according the claim 1, said organic material comprising expired food or waste food and said inorganic material comprising packaging or waste receptacles.

4. The method according to claim 1, further comprising transferring said de-pulped organics container or said de-pulped organic stream within said de-pulped organics container to a post processing operation, said post processing operation transforming said de-pulped organic stream into organic recycled material.

5. The method according the claim 1, said transporting said recovered organic stream to said de-pulping inlet comprising engaging a organics transport mechanism placing said recovered organic stream into an organics container.

6. The method according the claim 1, said transporting said recovered organic stream to said de-pulping machine comprising placing said recovered organic stream into an organics container and further comprising engaging a de-pulp inlet transport mechanism transferring said organics container to said de-pulping inlet.

7. The method according the claim 1, further comprising engaging an organics transport mechanism to move said recovered organic stream to said de-pulping inlet.

8. The method according to claim 1, further comprising transferring said de-pulped organic stream to at least one sieve before said introducing said de-pulped organic stream into said de-pulped organics container.

9. The method according the claim 1, further comprising the step of passing said recovered organic stream through an initial screen prior to said transporting said recovered organic stream to said de-pulping inlet, said initial screen removing a remaining portion of said large fragments of inorganic material from said recovered organic stream.

10. The method according the claim 2, further comprising engaging an inorganic transport mechanism and moving said at least a portion of said large fragments of inorganic material to said inorganic collection container.

11. The method according to claim 2, said de-pulped organic stream comprising miniature fragments of inorganic material.

12. The method according the claim 2, further comprising moving said removed portion of small fragments of inorganic material from a material capture outlet to a de-pulp inorganic collection container.

13. The method according the claim 2, further comprising transporting said inorganic collection container to an inorganic recycling facility.

14. The method according to claim 8, further comprising engaging a sieve transport mechanism to transfer said de-pulped organic stream to said at least one sieve.

15. The method according to claim 8, further comprising transferring said de-pulped organic stream to a first sieve, said de-pulped organic stream exiting said first sieve and entering a second sieve, and said de-pulped organic stream exiting said second sieve prior to deposit of said de-pulped organic stream into said de-pulped organics container.

16. The method according to claim 8, further comprising transferring said de-pulped organics container or said de-pulped organic stream within said de-pulped organics container to a post processing operation, said post processing operation transforming said de-pulped organic stream into organic recycled material.

17. The method according to claim 9, further comprising moving said remaining portion of said large fragments of inorganic material from said initial screen to said inorganic collection container.

18. The method according to claim 11, said at least one sieve removing at least a portion of said miniature fragments of inorganic material from said de-pulped organic stream.

19. The method according the claim 12, further comprising transferring said removed portion of small fragments of inorganic material from said de-pulp inorganic collection container to said inorganic collection container.

20. The method according to claim 18, further comprising transferring said removed portion of said miniature fragments of inorganic material to said inorganic collection container.

\* \* \* \* \*